US007752377B2

(12) United States Patent
Zou et al.

(10) Patent No.: US 7,752,377 B2
(45) Date of Patent: Jul. 6, 2010

(54) STRUCTURE COMPATIBLE WITH I2C BUS AND SYSTEM MANAGEMENT BUS AND TIMING BUFFERING APPARATUS THEREOF

(75) Inventors: Xiao-bing Zou, Shanghai (CN); Shih-Hao Liu, Taipei (TW)

(73) Assignee: Inventec Corporation, Taipei (TW)

( * ) Notice: Subject to any disclaimer, the term of this patent is extended or adjusted under 35 U.S.C. 154(b) by 297 days.

(21) Appl. No.: 12/015,378

(22) Filed: Jan. 16, 2008

(65) Prior Publication Data

US 2009/0119439 A1 May 7, 2009

(30) Foreign Application Priority Data

Nov. 2, 2007 (TW) .............................. 96141576 A

(51) Int. Cl.
*G06F 13/36* (2006.01)

(52) U.S. Cl. .......................... 710/315; 710/61; 709/230

(58) Field of Classification Search .................. 710/58, 710/61, 310, 315; 709/230
See application file for complete search history.

(56) References Cited

U.S. PATENT DOCUMENTS

2008/0201502 A1* 8/2008 Lee ............................ 710/61

* cited by examiner

*Primary Examiner*—Clifford H Knoll
(74) *Attorney, Agent, or Firm*—J.C. Patents

(57) ABSTRACT

A structure compatible with I2C bus and system management (SM) bus is provided. The structure includes a first device having an I2C bus interface, a second device having a SM bus interface, and a timing buffering apparatus connected between the I2C bus interface and the SM bus interface. The timing buffering apparatus provides a time delay when the first device sends data to the second device so as to meet the requirement of the second device to data holding time.

14 Claims, 3 Drawing Sheets

100

STRUCTURE COMPATIBLE WITH I2C BUS AND SYSTEM MANAGEMENT BUS AND TIMING BUFFERING APPARATUS THEREOF

CROSS-REFERENCE TO RELATED APPLICATION

This application claims the priority benefit of Taiwan application serial no. 96141576, filed on Nov. 2, 2007. The entirety of the above-mentioned patent application is hereby incorporated by reference herein and made a part of this specification.

BACKGROUND OF THE INVENTION

1. Field of the Invention

The present invention generally relates to a bus compatible structure, and more particularly, to a structure compatible with I2C bus and system management (SM) bus.

2. Description of Related Art

I2C bus (inter-IC bus or IC to bus) is usually adopted in computer network communication devices. I2C bus is a two-line serial bus which operates in a master/slave mode. Two-line communication signal lines can be categorized into serial clock lines (SCL) and serial data lines (SDA). The speed of an I2C bus is between 0 Hz and 3.4 MHz. An I2C bus allows multiple devices to operate on the same bus, wherein the master and slave transmit data based on the same clock. Since an I2C bus has only two lines, the slaves can be connected to the bus without any additional logic. System management (SM) bus is provided mostly based on the specification of I2C bus. SM bus is also a two-line serial bus which operates between 10 kHz and 100 kHz. However, SM bus and I2C bus have some different timing characteristics. SM bus requires a specific data holding time, while I2C bus delays its data holding time internally.

SM bus requires a data holding time of 300 ns, while the data holding time of I2C bus can be as low as 0 ns. Since SM bus and I2C bus have different requirements to the data holding time, a problem of incompatible data holding time may be produced when a master adopting I2C bus protocol accesses a slave adopting SM bus protocol. For example, a baseboard management controller in a server usually reads the information of an external slave (for example, an external sensor, power supply, or a backplane) through an I2C bus, but the external slave may adopt the SM bus specification. As a result, the baseboard management controller cannot read the information of the external slave due to the inconsistency in the data holding time thereof. Conventionally, a capacitor is disposed in an I2C bus interface in order to delay the signal transmission of the I2C bus. However, the data holding time of the I2C bus may not be up to the requirement due to load capacitance and signal reflex, and accordingly data access error may be caused.

SUMMARY OF THE INVENTION

Accordingly, the present invention is directed to a structure compatible with I2C bus and system management (SM) bus, so as to resolve the problem of inconsistent data holding time between I2C bus and SM bus in the conventional technique.

The present invention is directed to a timing buffering apparatus, wherein the timing buffering apparatus provides a time delay between a first device adopting I2C bus and a second device adopting SM bus when the first device transmits a data to the second device so as to ensure that the data is transmitted correctly.

The present invention provides a structure compatible with I2C bus and SM bus. The structure includes a first device, a second device, and a timing buffering apparatus. The first device has an I2C bus interface, and the second device has a SM bus interface. The timing buffering apparatus is connected between the I2C bus interface and the SM bus interface. When the first device drives a data line of the I2C bus interface to transform from a first state to a second state, the timing buffering apparatus allows a data line of the SM bus interface to stay in the first state for a holding time and then transform to the second state, or the timing buffering apparatus allows the data line of the SM bus interface to transform from the first state to the second state and then stay in the second state for the holding time.

The present invention provides a timing buffering apparatus connected between an I2C bus interface of a first device and a SM bus interface of a second device. The timing buffering apparatus includes a first-direction transmission circuit and a second-direction transmission circuit. When the first device drives a data line of the I2C bus interface to transform from a first state to a second state, the first-direction transmission circuit allows a data line of the SM bus interface to stay in the first state for a holding time and then transform to the second state, or the first-direction transmission circuit allows the data line of the SM bus interface to transform from the first state to the second state and then stay in the second state for the holding time. The first-direction transmission circuit further includes a first comparison sub-circuit, a first switch, a second switch, and a delay sub-circuit. The first comparison sub-circuit is connected to the I2C bus interface and outputs a first control signal according to the voltage level of the I2C bus interface. The first switch is disposed on a data transmission path from the first device to the second device, and the first switch receives the first control signal from the first comparison sub-circuit and is turned on/off according to the first control signal. The second switch is disposed on the data transmission path from the first device to the second device, and the second switch receives the first control signal from the first comparison sub-circuit and is turned on/off according to the first control signal. The delay sub-circuit is connected between the first switch and the second switch, and when the data transmission path from the first device to the second device is turned on, the delay sub-circuit provides the holding time to allow the data line of the SM bus interface to stay in the first state or the second state for this holding time. The second-direction transmission circuit transmits data from the second device to the first device. The second-direction transmission circuit further includes a second comparison sub-circuit and a third switch. The second comparison sub-circuit is connected to the SM bus interface and outputs a second control signal according to the voltage level of the SM bus interface. The third switch is disposed on a data transmission path from the second device to the first device, and the third switch receives the second control signal from the second comparison sub-circuit and is turned on/off according to the second control signal.

According to an embodiment of the present invention, the first comparison sub-circuit includes a first resistor and a first comparator. One terminal the first resistor is connected to the I2C bus interface, and the other terminal thereof is connected to the first switch. The first comparator has a first input terminal, a second input terminal, and an output terminal, wherein the first input terminal is connected to one terminal of the first resistor, the second input terminal is connected to the other terminal of the first resistor, and the output terminal is connected to the first switch. The first switch is a first tri-state buffer, wherein an input terminal and an output terminal of the first switch are disposed on a data transmission path from the first device to the second device, and a control terminal of the first switch is connected to the first comparison sub-circuit. The second switch is a second tri-state buffer, wherein an input terminal and an output terminal of the second switch are disposed on the data transmission path from the first device to the second device, and a control terminal of the second switch is connected to the first comparison sub-circuit. The delay sub-circuit includes a delay resistor and a capacitor. The delay resistor is connected between the first switch and the second switch. One terminal of the capacitor is connected to one terminal of the delay resistor connected to the second switch, and the other terminal of the capacitor is connected to the ground. The second comparison sub-circuit includes a second resistor and a second comparator. One terminal of the second resistor is connected to the SM bus interface, and the other terminal thereof is connected to the second switch. The second comparator has a first input terminal, a second input terminal, and an output terminal, wherein the first input terminal is connected to one terminal of the second resistor, the second input terminal is connected to the other terminal of the second resistor, and the output terminal is connected to the third switch. The third switch is a third tri-state buffer, wherein an input terminal and an output terminal of the third switch are disposed on the data transmission path from the second device to the first device, and a control terminal of the third switch is connected to the second comparison sub-circuit.

The present invention provides a structure compatible with I2C bus and SM bus, wherein a time delay is provided when a first device adopting I2C bus transmits data to a second device adopting SM bus so that the first device and the second device can transmit and receive data correctly and the interference caused by load capacitance and signal reflex can be avoided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
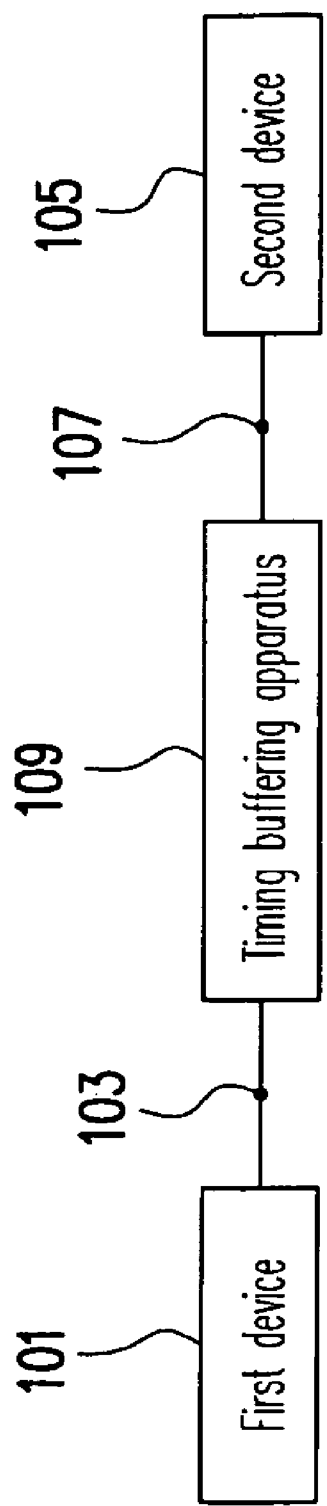
FIG. 1 is a schematic block diagram of a structure compatible with I2C bus and system management (SM) bus according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic block diagram of a structure compatible with I2C bus and system management (SM) bus according to an embodiment of the present invention.

Referring to FIG. 1, in the present embodiment, the structure 100 compatible to I2C bus and SM bus includes a first device 101, a second device 105, and a timing buffering apparatus 109. The first device 101 has an I2C bus interface 103, and the second device 105 has a SM bus interface 107. The timing buffering apparatus 109 is connected between the I2C bus interface 103 and the SM bus interface 107. When the first device 101 drives a data line of the I2C bus interface 103 to transform from a first state to a second state, the timing buffering apparatus 109 allows a data line of the SM bus interface 107 to stay in the first state for a holding time and then transform from the first state to the second state, or the timing buffering apparatus 109 allows the data line of the SM bus interface 107 to transform from the first state to the second state and then stay in the second state for a holding time. In other words, while transmitting data, the I2C bus adopted by the first device 101 requires only very short data holding time (or even no data holding time), while the SM bus adopted by the second device 105 requires a particular data holding time. Thus, according to the present invention, a timing buffering apparatus 109 is disposed between the I2C bus interface 103 and the SM bus interface 107 and a time delay is provided when the first device 101 and the second device 105 transmit data to each other such that the data can be transmitted and received correctly.

Figure 2:
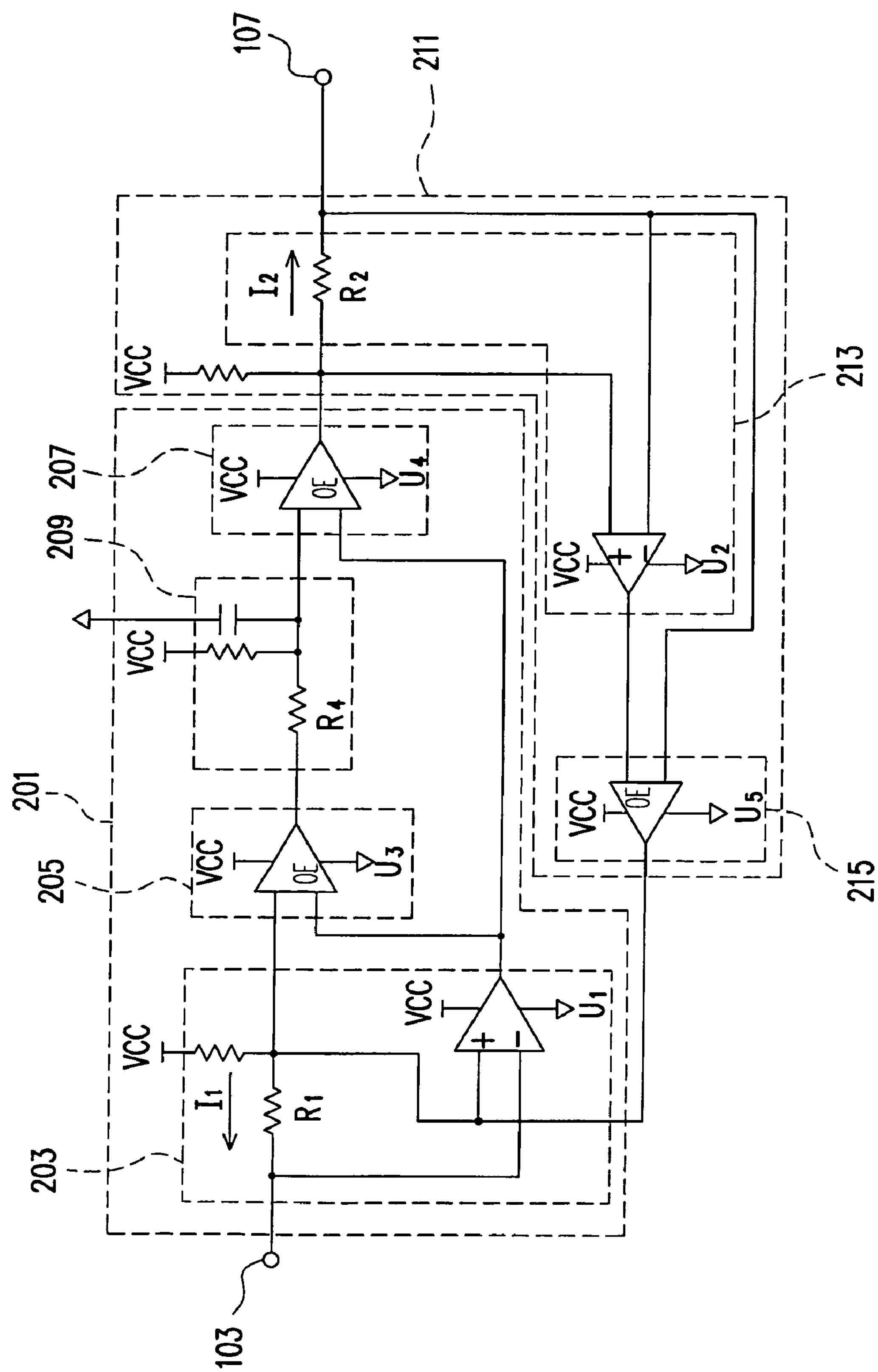
FIG. 2 is a circuit diagram of a timing buffering apparatus according to an embodiment of the present invention.

FIG. 2 is a circuit diagram of a timing buffering apparatus according to an embodiment of the present invention.

Referring to FIG. 2, in the present embodiment, a timing buffering apparatus 109 is connected between an I2C bus interface 103 and a SM bus interface 107. The timing buffering apparatus 109 includes a first-direction transmission circuit 201 and a second-direction transmission circuit 211. When the first device 101 drives a data line of the I2C bus interface 103 to transform from a first state to a second state, the first-direction transmission circuit 201 allows a data line of the SM bus interface 107 to stay in the first state for a holding time and then transform from the first state to the second state, or the first-direction transmission circuit 201 allows the data line of the SM bus interface 107 to transform from the first state to the second state and then stay in the second state for a holding time. The first-direction transmission circuit 201 further includes a first comparison sub-circuit 203, a first switch 205, a second switch 207, and a delay sub-circuit 209. The first comparison sub-circuit 203 is connected to the I2C bus interface 103 and outputs a control signal according to the voltage level of the I2C bus interface 103. In the present embodiment, the first comparison sub-circuit 203 includes a first resistor R1 and a first comparator U1. One terminal of the first resistor R1 is connected to the I2C bus interface 103, and the other terminal thereof is connected to the first switch 205. The first comparator U1 has a first input terminal, a second input terminal, and an output terminal, wherein the first input terminal is connected to one terminal of the first resistor R1, the second input terminal is connected to the other terminal of the first resistor R1, and the output terminal is connected to the first switch 205. The first switch 205 is disposed on a data transmission path from the first device 101 to the second device 105. The first switch 205 receives the control signal output by the first comparison sub-circuit 203 and is turned on/off according to this control signal. In the present embodiment, the first switch 205 is a first tri-state buffer U3, wherein an input terminal and an output terminal of the first tri-state buffer U3 are disposed on the data transmission path from the first device 101 to the second device 105, and a control terminal thereof is connected to the output terminal of the first comparator U1. The second switch 207 is disposed on the data transmission path from the first device 101 to the second device 105. The second switch 207 receives the control signal output by the first comparison sub-circuit 203 and is turned on/off according to this control signal. In the present embodiment, the second switch 207 is a second tri-state buffer U4, wherein an input terminal and an output terminal of the second tri-state buffer U4 are disposed on the data transmission path from the first device 101 to the second device 105, and a control terminal thereof is connected to the output terminal of the first comparator U1. The delay sub-circuit 209 is connected between the first switch 205 and the second switch 207, and when the data transmission path from the first device 101 to the second device 105 is turned on, the delay sub-circuit 209 provides a holding time to allow the data line of the SM bus interface 107 to stay in the first state or the second state for this holding time. In the present embodiment, the delay sub-circuit 209 includes a delay resistor R4 and a capacitor C1. One terminal of the delay resistor R4 is connected to the output terminal of the first ti-state buffer U3, and the other terminal thereof is connected to the input terminal of the second tri-state buffer U4. One terminal of the capacitor C1 is connected to the input terminal of the second tri-state buffer U4, and the other terminal thereof is connected to the ground. The second-direction transmission circuit 211 is used for realizing the transmission of data from the second device 105 to the first device 101. The second-direction transmission circuit 211 further includes a second comparison sub-circuit 213 and a third switch 215. The second comparison sub-circuit 213 is connected to the SM bus interface 107 and outputs a control signal according to the voltage level of the SM bus interface 107. In the present embodiment, the second comparison sub-circuit 213 includes a second resistor R2 and a second comparator U2. One terminal of the second resistor R2 is connected to the SM bus interface, and the other terminal thereof is connected to the output terminal of the second tri-state buffer U4. The second comparator U2 has a first input terminal, a second input terminal, and an output terminal, wherein the first input terminal is connected to one terminal of the second resistor R2, the second input terminal is connected to the other terminal of the second resistor R2, and the output terminal is connected to the third switch 215. The third switch 215 is disposed on a data transmission path from the second device 105 to the first device 101. The third switch 215 receives the control signal output by the second comparison sub-circuit 213 and is turned on/off according to this control signal. In the present embodiment, the third switch 215 is a third tri-state buffer U5, wherein an input terminal and an output terminal of the third tri-state buffer U5 are disposed on the data transmission path from the second device 105 to the first device 101, and a control terminal thereof is connected to the output terminal of the second comparator U2.

When the timing buffering apparatus 109 is in operation and the first device 101 transmits data to the second device 105, the first device 101 pulls down the voltage level of the I2C bus interface 103 so that the current I1 is positive and accordingly the first comparator U1 outputs a positive signal. After receiving the positive signal output by the first comparator U1, the first tri-state buffer U3 and the second tri-state buffer U4 turn on the data transmission path from the first device 101 to the second device 105. A delay for a signal to transform from a high voltage level to a low voltage level is produced at the input terminal of the second tri-state buffer U4 due to the delay effect of the delay resistor R4 and the capacitor C1, wherein the delay time T is a multiple of the product between the value of the delay resistor R4 and the value of the capacitor C1. Besides, the delay time can be adjusted by adjusting the capacitance of the capacitor C1 or replacing the capacitor C1 with another capacitor according to different data holding time. When the second device 105 sends data to the first device 101, the second device 105 pulls down the voltage level of the SM bus interface 107 so that the current I2 is positive and accordingly the second comparator U2 outputs a positive signal. After receiving the positive signal output by the second comparator U2, the third tri-state buffer U5 turns on the data transmission path from the second device 105 to the first device 101 so as to achieve bi-directional data transmission.

Figure 3:
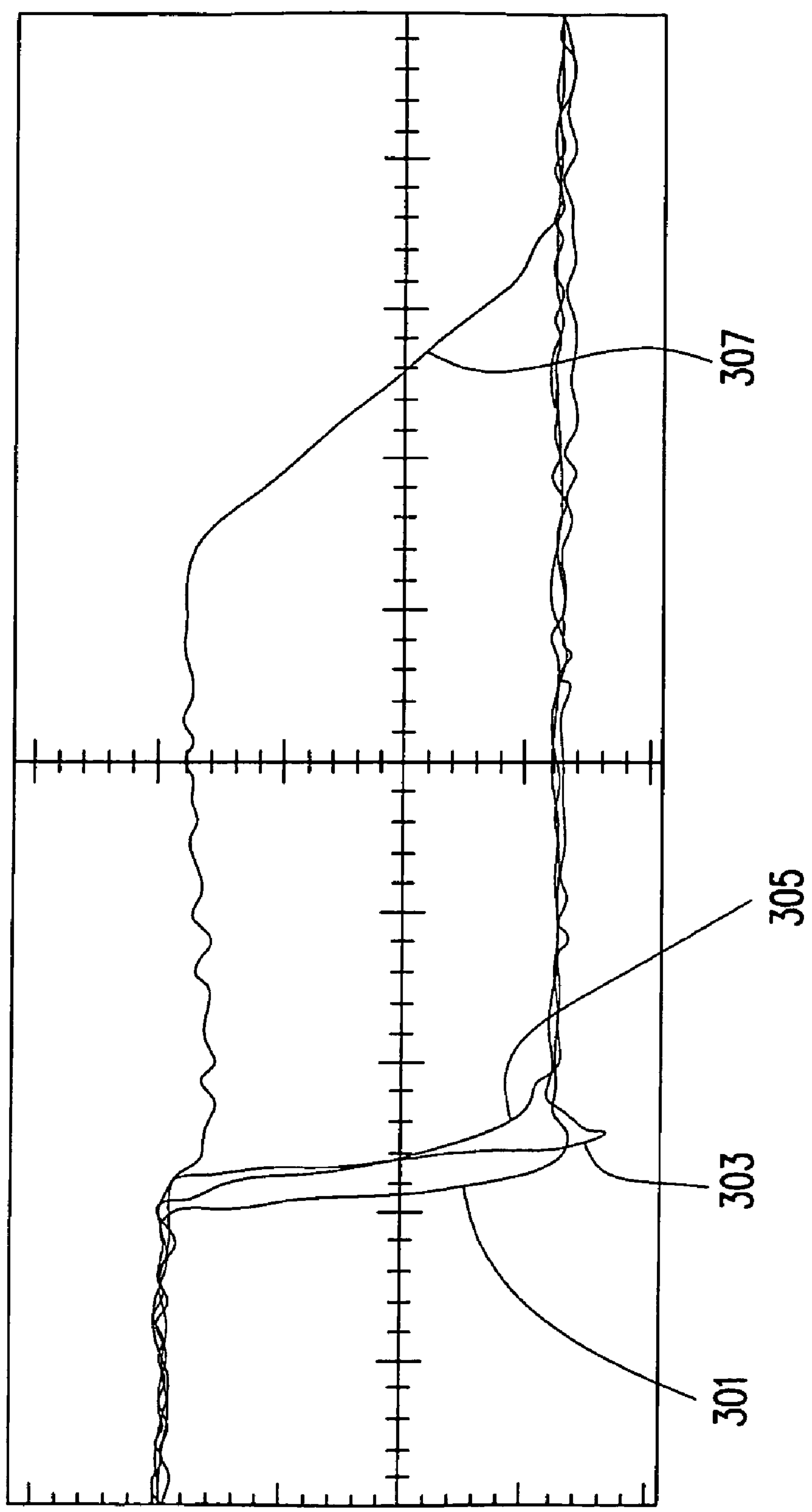
FIG. 3 illustrates the waveforms of various signals when a timing buffering apparatus transmits data from an I2C bus to a SM bus according to an embodiment of the present invention.

FIG. 3 illustrates the waveforms of various signals when a timing buffering apparatus transmits data from an I2C bus to a SM bus according to an embodiment of the present invention.

A first device outputs the data through its internal I2C bus, wherein the holding time between the clock signal 301 and the data signal 303 on the I2C bus is 15 ns. Through the function of the timing buffering apparatus provided by the present invention, the holding time between the data signal 307 and the clock signal 305 on the SM bus is expanded to 380 ns, which meets the requirement of a second device adopting the SM bus to data holding time. Besides, harmonic interference to the clock signals and data signals caused by load capacitance and signal reflex is also avoided.

In summary, according to the present invention, a timing buffering apparatus is connected between a first device adopting I2C bus and a second device adopting SM bus, so that a time delay can be provided to the I2C bus when the first device sends data to the second device, and accordingly the requirement of the SM bus to data holding time can be met. Moreover, based on the structure compatible to I2C bus and SM bus provided by the present invention, input bus and output bus are separated so that load capacitance and signal reflex can be avoided, and accordingly, harmonic interference at the falling edges of clock lines and data lines is prevented. Thereby, the bad effect to signal quality caused by simply disposing a capacitor externally can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A structure compatible with I2C bus and system management (SM) bus, comprising:

a first device, having an I2C bus interface;

a second device, having a SM bus interface; and a timing buffering apparatus, connected between the I2C bus interface and the SM bus interface, the timing buffering apparatus comprising:

a first-direction transmission circuit, wherein when the first device drives a data line of the I2C bus interface to transform from the first state to the second state, the first-direction transmission circuit allows a data line of the SM bus interface to stay in the first state for a holding time and then transform from the first state to the second state, or the first-direction transmission circuit allows the data line of the SM bus interface to transform from the first state to the second state and stay in the second state for the holding time, the first-direction transmission circuit comprising:

a first comparison sub-circuit, connected to the I2C bus interface, the first comparison sub-circuit outputting a first control signal according to the voltage level of the I2C bus interface;

a first switch, disposed on a data transmission path from the first device to the second device, wherein the first switch receives the first control signal from the first comparison sub-circuit and is turned on/off according to the first control signal;

a second switch, disposed on the data transmission path from the first device to the second device, wherein the second switch receives the first control signal from the first comparison sub-circuit and is turned on/off according to the first control signal; and a delay sub-circuit, connected between the first switch and the second switch, wherein when the data transmission path from the first device to the second device is turned on, the delay sub-circuit provides the holding time to allow the data line of the SM bus interface to stay in the first state or the second state for the holding time;

a second-direction transmission circuit, for transmitting data from the second device to the first device, the second-direction transmission circuit comprising:

a second comparison sub-circuit, connected to the SM bus interface, the second comparison sub-circuit outputting a second control signal according to the voltage level of the SM bus interface; and a third switch, disposed on a data transmission path from the second device to the first device, wherein the third switch receives the second control signal from the second comparison sub-circuit and is turned on/off according to the second control signal.

2. The structure according to claim 1, wherein the first switch is a first tri-state buffer having an input terminal and an output terminal disposed on the data transmission path from the first device to the second device and a control terminal connected to the first comparison sub-circuit.

3. The structure according to claim 1, wherein the second switch is a second tri-state buffer having an input terminal and an output terminal disposed on the data transmission path from the first device to the second device and a control terminal connected to the first comparison sub-circuit.

4. The structure according to claim 1, wherein the delay sub-circuit comprises:

a delay resistor, connected between the first switch and the second switch; and a capacitor, having one terminal connected to one terminal of the delay resistor which is connected to the second switch and the other terminal connected to the ground.

5. The structure according to claim 1, wherein the first comparison sub-circuit comprises:

a first resistor, having one terminal connected to the I2C bus interface and the other terminal connected to the first switch; and a first comparator, having a first input terminal connected to one terminal of the first resistor, a second input terminal connected to the other terminal of the first resistor, and an output terminal connected to the first switch.

6. The structure according to claim 1, wherein the third switch is a third tri-state buffer having an input terminal and an output terminal disposed on the data transmission path from the second device to the first device and a control terminal connected to the second comparison sub-circuit.

7. The structure according to claim 1, wherein the second comparison sub-circuit comprises:

a second resistor, having one terminal connected to the SM bus interface and the other terminal connected to the second switch; and a second comparator, having a first input terminal connected to one terminal of the second resistor, a second input terminal connected to the other terminal of the second resistor, and an output terminal connected to the third switch.

8. A timing buffering apparatus, connected between an I2C bus interface of a first device and a SM bus interface of a second device, the timing buffering apparatus comprising:

a first-direction transmission circuit, wherein when the first device drives a data line of the I2C bus interface to transform from a first state to a second state, the first-direction transmission circuit allows a data line of the SM bus interface to stay in the first state for a holding time and then transform from the first state to the second state, or the first-direction transmission circuit allows the data line of the SM bus interface to transform from the first state to the second state and then stay in the second state for the holding time, the first-direction transmission circuit comprising:

a first comparison sub-circuit, connected to the I2C bus interface, the first comparison sub-circuit outputting a first control signal according to the voltage level of the I2C bus interface;

a first switch, disposed on a data transmission path from the first device to the second device, wherein the first switch receives the first control signal from the first comparison sub-circuit and is turned on/off according to the first control signal;

a second switch, disposed on the data transmission path from the first device to the second device, wherein the second switch receives the first control signal from the first comparison sub-circuit and is turned on/off according to the first control signal; and a delay sub-circuit, connected between the first switch and the second switch, wherein when the data transmission path from the first device to the second device is turned on, the delay sub-circuit provides the holding time to allow the data line of the SM bus interface to stay in the first state or the second state for the holding time;

a second-direction transmission circuit, for transmitting data from the second device to the first device, the second-direction transmission circuit comprising:

a second comparison sub-circuit, connected to the SM bus interface, the second comparison sub-circuit outputting a second control signal according to the voltage level of the SM bus interface; and a third switch, disposed on a data transmission path from the second device to the first device, wherein the third switch receives the second control signal from the second comparison sub-circuit and is turned on/off according to the second control signal.

9. The timing buffering apparatus according to claim 8, wherein the first switch is a first tri-state buffer having an input terminal and an output terminal disposed on the data transmission path from the first device to the second device and a control terminal connected to the first comparison sub-circuit.

10. The timing buffering apparatus according to claim 8, wherein the second switch is a second tri-state buffer having an input terminal and an output terminal disposed on the data transmission path from the first device to the second device and a control terminal connected to the first comparison sub-circuit.

11. The timing buffering apparatus according to claim 8, wherein the delay sub-circuit comprises:

a delay resistor, connected between the first switch and the second switch; and a capacitor, having one terminal connected to one terminal of the delay resistor which is connected to the second switch and the other terminal connected to the ground.

12. The timing buffering apparatus according to claim 8, wherein the first comparison sub-circuit comprises:

a first resistor, having one terminal connected to the I2C bus interface and the other terminal connected to the first switch; and a first comparator, having a first input terminal connected to one terminal of the first resistor, a second input terminal connected to the other terminal of the first resistor, and an output terminal connected to the first switch.

13. The timing buffering apparatus according to claim 8, wherein the third switch is a third tri-state buffer having an input terminal and an output terminal disposed on the data transmission path from the second device to the first device and a control terminal connected to the second comparison sub-circuit.

14. The timing buffering apparatus according to claim 8, wherein the second comparison sub-circuit comprises:

a second resistor, having one terminal connected to the SM bus interface and the other terminal connected to the second switch; and a second comparator, having a first input terminal connected to one terminal of the second resistor, a second input terminal connected to the other terminal of the second resistor, and an output terminal connected to the third switch.

* * * * *